United States Patent
Rinckes et al.

(10) Patent No.: US 8,868,340 B1
(45) Date of Patent: Oct. 21, 2014

(54) PROPOSING TRANSIT POINTS BY ANALYZING TRAVEL PATTERNS

(71) Applicant: Google Inc., Mountain View, CA (US)

(72) Inventors: Douglas Antony Rinckes, Thalwil (CH); Csaba Zoltán Garay, Adliswil (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/919,964

(22) Filed: Jun. 17, 2013

Related U.S. Application Data (60) Provisional application No. 61/660,558, filed on Jun. 15, 2012.

(51) Int. Cl.
G06F 19/00 (2011.01)
G01C 21/00 (2006.01)
G06F 17/30 (2006.01)

(52) U.S. Cl.
CPC ............ G01C 21/00 (2013.01); *G06F 17/3087* (2013.01)
USPC ................. 701/468; 342/357.37; 342/357.56; 180/168

(58) Field of Classification Search
CPC ............... G01C 21/00; G06F 17/3087; Y01S 707/99942; Y01S 707/99943; Y01S 707/99945
USPC ......... 701/468; 342/357.37, 357.56; 343/765, 343/882, 892; 180/168; 702/159; 33/367; 356/3; 382/154; 370/248
See application file for complete search history.

(56) References Cited

U.S. PATENT DOCUMENTS

| | | | |
|---|---|---|---|
| 5,802,492 A * | 9/1998 | DeLorme et al. ........... 455/456.5 |
| 6,321,158 B1 * | 11/2001 | DeLorme et al. ............ 701/426 |
| 2003/0182052 A1 * | 9/2003 | DeLorme et al. ............ 701/201 |
| 2005/0096840 A1 * | 5/2005 | Simske ........................ 701/202 |
| 2005/0222755 A1 * | 10/2005 | Tengler et al. ............... 701/201 |
| 2006/0089787 A1 | 4/2006 | Burr et al. | |
| 2012/0166240 A1 * | 6/2012 | Jones et al. ................... 705/7.12 |
| 2013/0046586 A1 * | 2/2013 | Lerner et al. ................ 705/7.39 |
| 2013/0217367 A1 * | 8/2013 | Amidon et al. ............ 455/414.1 |
| 2013/0238241 A1 * | 9/2013 | Chelotti et al. ............... 701/533 |

* cited by examiner

*Primary Examiner* — McDieunel Marc
(74) *Attorney, Agent, or Firm* — McDermott Will & Emery LLP (57) ABSTRACT

A computer-implemented method for analyzing travel patterns in transit systems is provided. The method includes identifying an existing transit point of a transit system and receiving location information including geo-location paths of a plurality of mobile devices. Each of the geo-location paths includes the identified transit point. The method also includes determining a proposed transit point for the transit system based on the geo-location paths of the received location information. Systems and machine-readable media are also provided.

19 Claims, 5 Drawing Sheets

PROPOSING TRANSIT POINTS BY ANALYZING TRAVEL PATTERNS

CROSS-REFERENCE TO RELATED APPLICATIONS

The present application claims the benefit of priority under 35 U.S.C. §119 from U.S. Provisional Patent Application Ser. No. 61/660,558, filed on Jun. 15, 2012, the disclosure of which is hereby incorporated by reference in its entirety for all purposes.

TECHNICAL FIELD

The present disclosure generally relates to analyzing travel patterns, and more particularly to proposing transit points by analyzing travel patterns.

BACKGROUND

Users of transit systems such as, for example, buses, trams, ferries, and trains, may carry mobile devices (e.g., smartphones, tablet computers, laptop computers) with them while using the transit system. Location information associated with the mobile devices may be available.

SUMMARY

The disclosed subject technology relates to a computer-implemented method for analyzing travel patterns to propose transit points. The method includes identifying an existing transit point of a transit system and receiving location information including geo-location paths of a plurality of mobile devices. Each of the geo-location paths includes the identified transit point. The method also includes determining a proposed transit point for the transit system based on the geo-location paths of the received location information.

The disclosed subject technology further relates to a system for analyzing travel patterns to propose transit points. The system includes a memory storing executable instructions. The system also includes a processor coupled to the memory configured to execute the stored executable instructions to receive route planning query data associated with a transit system and identify an existing transit point of the transit system based on the received route planning query data. The processor is also configured to receive location information including geo-location paths of a plurality of mobile devices, each of the geo-location paths including the identified transit point. The processor is further configured to determine a proposed transit point for the transit system based on the geo-location paths of the received location information.

The disclosed subject technology also relates to a machine-readable storage medium comprising machine-readable instructions for causing a processor to execute a method for analyzing travel patterns to propose transit points. The method includes receiving a route planning query data associated with a transit system and identifying an existing transit point of the transit system based on the received route planning query data. The method also includes receiving location information associated with mobile devices of users of the transit system. The location information includes geo-location paths of a plurality of mobile devices, and each of the geo-location paths includes the identified transit point. The method further includes determining end points of the geo-location paths, and determining a proposed transit points for the transit system based on the determined end points of the geo-location paths.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Transit points or transit stops such as, for example, bus stops, trolley stops, train stations, tram stops, ferry stops and taxi stands, may not be located near a major attraction or other popular locations. Relocating the transit points or providing other transportation means to the major attraction could increase efficiency of the transit systems and convenience of the passengers. Transit agencies operating the transit systems may have trip planners or other types of route planning services which recommend routes that users may take from one transit point to another. However, information is limited to transit points and no information is routinely available as to the ultimate destination of the users—which may not be necessarily close to the destination transit points recommended by the route planning services.

According to various aspects of the subject technology, a method and system for analyzing travel patterns to propose transit points is provided. Location information such as, for example, global locationing system data, associated with mobile devices may be analyzed to identify popular ultimate destinations near a transit point for users carrying the mobile devices. The mobile devices may be, for example, cell phones, smartphones, laptops, tablets and navigation systems. Global locationing system data may include Global Locationing System (GLS) data, Global Positioning System (GPS) data, GLONASS data, Galileo data) or other data which represent the direction and/or the location of mobile devices. The global locationing system data may be provided from one or more sources (e.g., satellite, earth magnetism sensor). The transit point for analysis may be determined based on data gathered from queries on route planning services. Such information may be analyzed to propose new locations for existing transit points or new transit points such that the transit points may be positioned closer to popular destinations, or otherwise improve transit to the ultimate destinations.

The location information may also include other types of data such as, for example, cell tower triangulation data and Wi-Fi access point data, which may also be used for determining the ultimate destinations. In addition, accelerometer readings may be used to determine the mode of transportation of users of carrying mobile devices, and whether the users have switched to a different mode of transportation. For example, the accelerometer readings may have different patterns between when users are on a train and when the users are walking.

In determining the transit point for analysis, data associated with route planning queries made on route planning services are analyzed to identify a popular destination transit point or a popular starting transit point. Other schemes or methods may also be used to determine the transit point for analysis. From the determined transit point for analysis, location data or other location information which may be available are analyzed to determine where users may be ultimately headed, or originated from. Specifically, the location information may include geo-location path data showing the paths the mobile devices took. From such paths, those which include the determined transit point may be analyzed, and a popular location at which more than a predetermined number of endpoints of the paths lie are determined. The endpoints of the paths may be beginning points of the paths or terminating points of the paths. Paths which do not include the determined transit point may also be included in the analysis.

Based on information on the determined popular location, the new location of the transit point may be proposed such that the users' overall travel to the determined popular locations is made more efficient. For example, transit points may be moved closer to the popular locations, or alternate transit routes may be newly established if existing transit points are not easily relocated (e.g., train stations). The proposal may be made based on a predetermined method, scheme or heuristics, or may be performed by an external entity (e.g., a transit agency) which has received information on the determined popular location.

In example aspects, the location data or other location information may not identify individual users, but may only indicate that an anonymous user is at a location, or that the user is moving/has moved in a certain direction. Such location data or location information may only be made available upon user authorization, and the users may be able to revoke the authorization at any time.

The location information may also be used to determine congestion levels of the transit points, and provide information to the users on an alternate route which may make the overall travel more efficient. For example, if a transit point is very crowded and the average wait time at the transit point is very long, an alternate, less crowded transit point may be suggested which may be accessed within less than the wait time of the current transit point. Also, the congestion levels of the transit points may also be used in proposing new location for existing transit points or new transit points of the transit system. For example, a congested transit point may be given higher priority when determining the order in which the new location of existing transit points are proposed.

Figure 1:
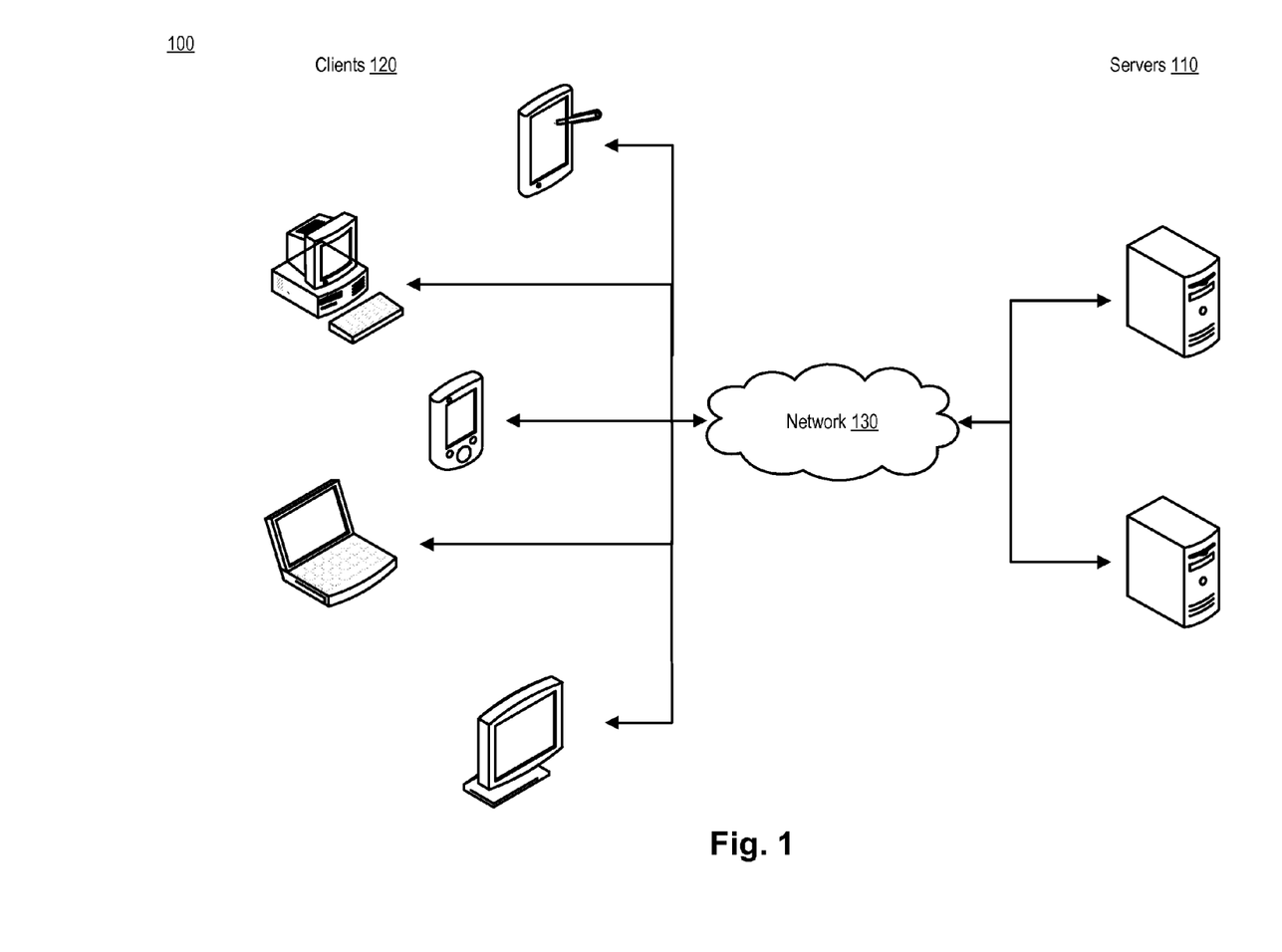
FIG. 1 illustrates an example architecture for analyzing travel patterns to propose transit points.

FIG. 1 illustrates an example architecture 100 for analyzing travel patterns to propose transit points. The architecture 100 includes servers 110 and clients 120 connected over a network 130. Each of the clients 120 may interact with users and communicate with the servers 110 to analyze travel patterns to propose transit points. The clients 120 may be, for example, mobile devices (e.g., smartphones, tablet computers, PDAs, laptop computers, or navigation systems) with which location information is associated. The clients 120 may also be terminals (e.g., smartphones, tablet computers, PDAs, navigation systems, desktop computers, laptop computers, set top boxes, televisions, video game consoles, or home appliances) with which users may interact to send route planning queries and receive their responses.

The servers 110 may be any device having a processor, memory, and communications capability for communicating with the clients 120 for analyzing travel patterns to propose transit points. For example, the servers 110 may receive the location information associated with the mobile devices and data on route planning queries sent from the terminals to determine a transit location for analysis, analyze the location information to determine a popular location, and propose new locations of existing transit points or new transit points for the transit system.

The network 130 may include, for example, any one or more of a wireless telephone network, a personal area network (PAN), a local area network (LAN), a campus area network (CAN), a metropolitan area network (MAN), a wide area network (WAN), a broadband network (BBN), the Internet, and the like. Further, the network 130 can include, but is not limited to, any one or more of the following network topologies, including a bus network, a star network, a ring network, a mesh network, a star-bus network, tree or hierarchical network, and the like.

Figure 2:
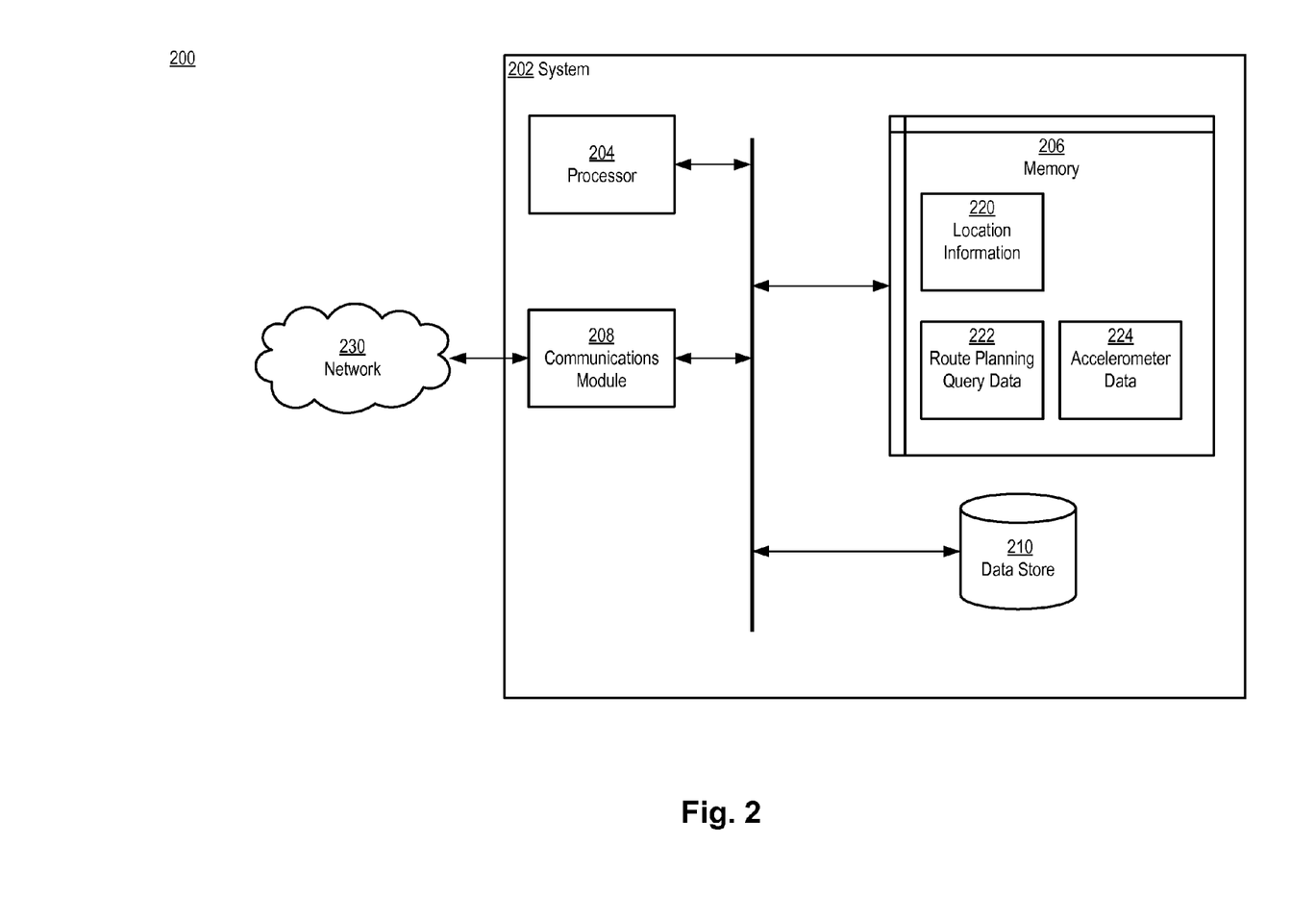
FIG. 2 is a block diagram illustrating an example system for analyzing travel patterns to propose transit points.

FIG. 2 is a block diagram 200 illustrating an example system 202 for analyzing travel patterns to propose transit points. The system 202 may be implemented, for example, at a server 110 or spread across servers 110 and clients 120. The system 202 includes a processor 204 and a memory 206. The system 202 also includes a communications module 208, and is connected to the network 230 via the communications module 208. The network 230 may be, for example, the network 130. The communications module 208 is configured to interface with the network 230 to send and receive information, such as data, requests, responses, and commands to other devices (e.g., clients 120) or systems on the network 230. The data sent and received through the communications module 208 may include location information associated with the clients 120 and data on route planning queries sent by the clients. The communications module 208 may be, for example, modems, Ethernet cards or mobile broadband adaptors.

The memory 206 includes location information 220. The location information 220 is associated with mobile devices (e.g., clients 120) which may be travelling with their users. The location information 220 may include, for example, GLS data, GPS data, GLONASS data, Galileo data, earth magnetism sensor data, cell tower triangulation data, Wi-Fi access point data, and geo-location path data generated from one or more of the foregoing types of data. Geo-location path data identify the paths the associated mobile devices took from an endpoint (e.g., origination point of the path) to another endpoint (e.g., termination point of the path). The memory 206 also includes route planning query data 222. The route planning query data 222 are data which represent the route planning queries which may be sent by the users through terminals (e.g., clients 120) requesting a suggested route from a given transit point to a desired transit point. The route planning query data 222 may include information on a starting transit point for the suggested route and the desired destination transit point. The memory 206 may also include an accelerometer data 224. The mobile devices may include accelerometers, and data from such accelerometers may be communicated to the system 202 and stored in the memory 206 as accelerometer data 224. The accelerometer data 224 may be analyzed to determine the mode of transportation that the users of the associated mobile devices are in, by determining the patterns, or change in the patterns, of acceleration.

System 202 may also include a data store 210, which may also store the location information 220, the route planning query data 222, and/or the accelerometer data 224. The data store 210 may be integrated with the memory 206, or may be independent from the memory and be in communication with the processor 204 and the memory. The data store 210 may also be implemented to be independent from the system 202 and in communication with the system.

The processor 204 is configured to execute instructions, such as instructions physically coded into the processor, instructions received in the form of software from the memory 206, or a combination of both. For example, the processor 204 is configured to execute instructions to identify an existing transit point of a transit system. The existing transit point may be identified from route planning query data received from terminals such as, for example, clients 120. The processor is also configured to receive location information including geo-location paths of a plurality of mobile devices, each of the geo-location paths including the identified transit point. The processor is further configured to determine a proposed transit point for the transit system based on the geo-location paths of the received location information.

Figure 3:
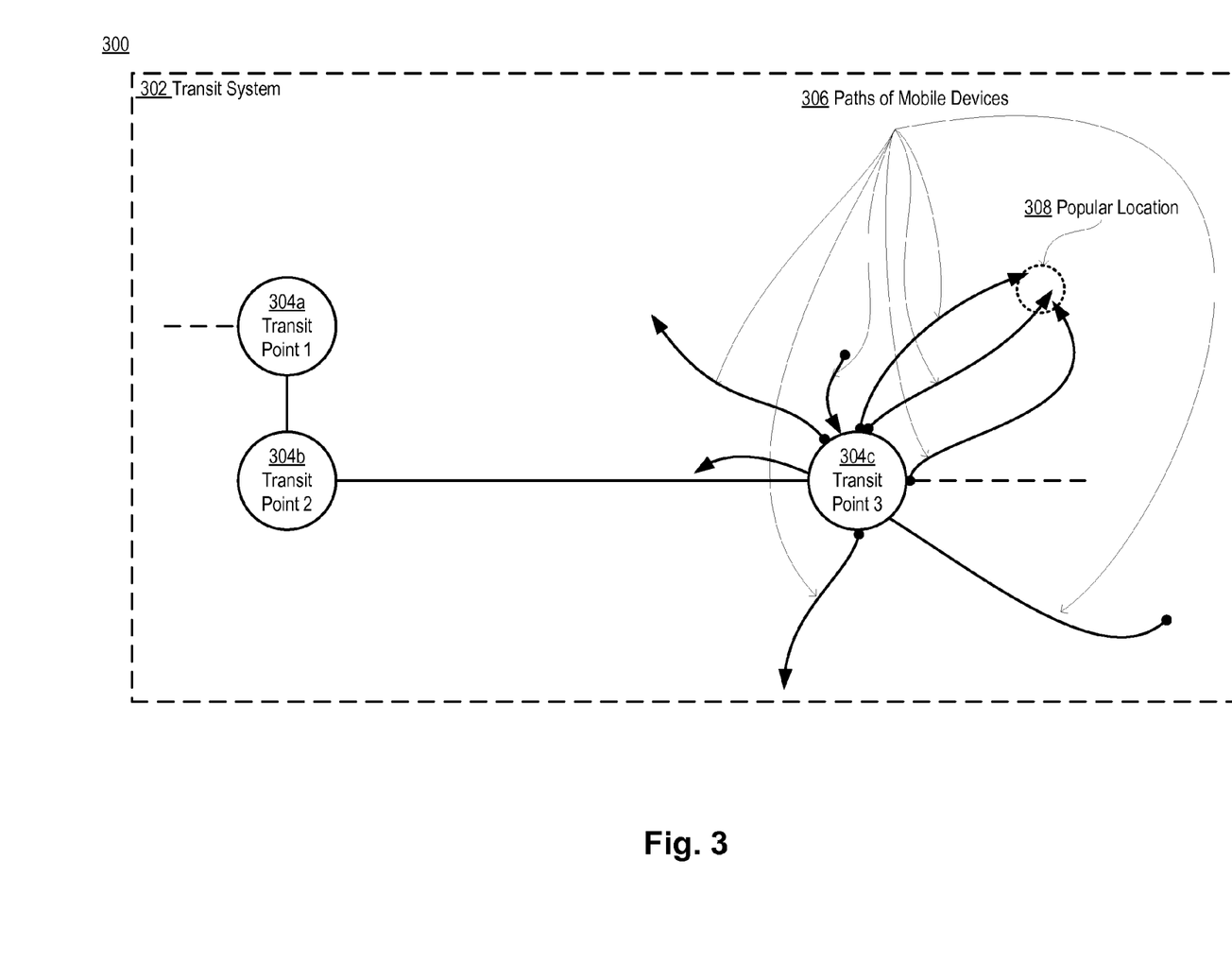
FIG. 3 is a diagram illustrating example operations for analyzing travel patterns to propose transit points.

FIG. 3 is a diagram 300 illustrating example operations for analyzing travel patterns to propose transit points for an example transit system 302. The operations may be performed, for example, by the system 202. The transit system 302 includes multiple transit points, including transit points 304a-304c. First, a transit point for analysis is identified from the multiple transit points of the transit system 302. The transit point for analysis may be identified based on route planning query data (e.g., route planning query data 222). Users may send route planning queries to route planning services via terminals such as, for example, clients 120. The route planning query data may include such queries and responses the users receive in response to the queries. The route planning query data may contain information on the beginning transit point and a transit point the users submitting the route planning queries wish to reach. The route planning query data may also include suggested transit points that are suggested by the route planning services. By analyzing route planning query data for multiple queries and/or their responses, a transit point for analysis may be identified. The transit point for analysis may be identified based on the popularity of the transit points in the route planning queries, or may be identified based on other methods, schemes, or heuristics.

Diagram 300 shows that transit point 304c is identified for analysis. Based on the identified transit point 304c, location information of mobile devices (e.g., clients 120) are analyzed to identify popular ultimate destinations of users of mobile devices who have passed by the transit point 304c. Specifically, the location information may include information on geo-location path 306 of the users of the mobile devices. The endpoints of the paths 306 are analyzed to determine popular ultimate destinations, or popular origination points of the users of the mobile devices. In diagram 300, the arrow heads of the paths 306 represent the termination end points, and the round dots represent the origination end points. Diagram 300 shows a popular location 308 which has been determined based on the path 306. While the popular location 308 represents a popular termination end point, a popular origination end point may also be identified as a popular location. In an aspect of the subject technology, in determining the popular location 308, only those paths 306 which include the determined transit point 304c are analyzed. However, in another aspect of the subject technology, paths 306 which do not include transit points 304c, but which pass by within a predetermined distance from the transit point, may also be used in the analysis for identifying the popular location 308.

After the popular location 308 is identified, the popular location may be suggested as a proposed transit point in order to optimize the transit system. The transit point 304c may be suggested to be relocated to the proposed transit point, or the proposed transit point may be proposed as a new transit point in addition to the transit point 304c. Information on the popular location 308 may also be communicated to a transit agency or other entities interested in considering new transit points for the transit system 302, and proposal of transit points for the transit system may be made according to the needs of the entity receiving the information on the popular location.

In analyzing the paths 306 to propose transit points for the transit system 302, accelerometer data (e.g., accelerometer data 224) may be used to identify the mode of transportation of users along the paths. For example, accelerometer data may show different patterns of acceleration experienced by the mobile devices that the users may carry, depending on the mode of transportation of the users. Acceleration associated with a walking user may be different from that of a user on a train. Therefore, using the accelerometer readings, different modes of transportation that the users took along the paths 306 may be identified, and such information may be used in proposing transit points for the transit system 302. For example, if many users took a taxi from the transit point 304c to the popular location 308, a shuttle bus may be provided between the transit point and the popular location. On the other hand, if many users walked to the popular location 308, it may indicate that the transit point 304c is relatively close to the popular location, and no new transit points may need to be proposed.

The location information may also be used to determine the congestion levels of the transit points in the transit system 302, including the transit points 304a-304c. For example, based on the location information, transit point 304c may be determined to experience a congestion level higher than a predetermined threshold value. Such congestion level information may be determined in real time. Historical congestion levels may also be determined. Real time congestion level information may be communicated to the users such that the users may plan their trips accordingly. Information such as transit system operation schedules may also be received and used to generate additional information to help users plan their trips. For example, based on the congestion levels and operation schedules, an average wait time for users at the transit point 304c may be determined, and if a short walk to a nearby, less congested transit point (e.g., transit point 304b) is less than the average wait time, such information may be communicated to the users.

Historical congestion levels may be used in proposing transit points for the transit system 302. For example, if prioritization is needed for optimizing the various transit points within the transit system 302, then the transit points having higher historical congestion levels may be given priority.

Figure 4:
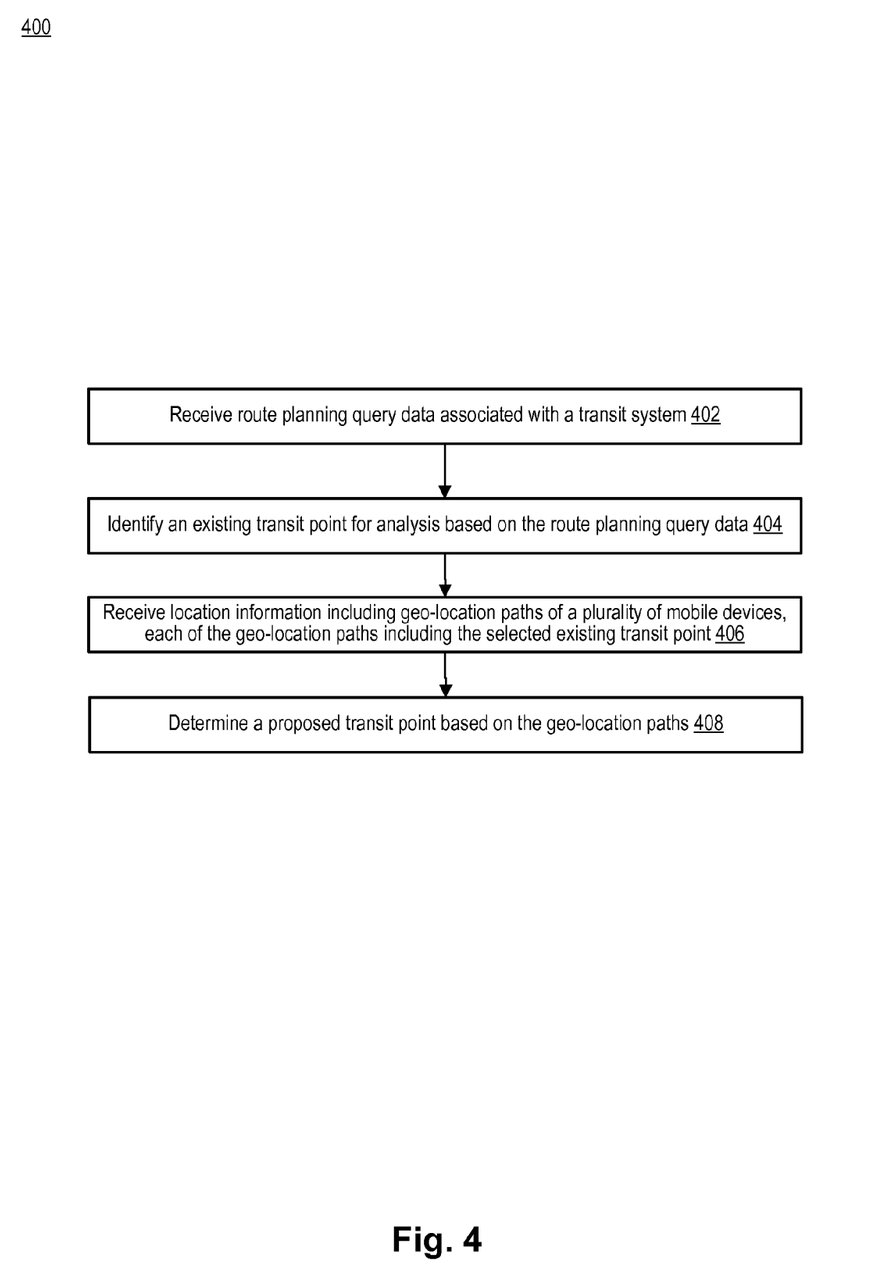
FIG. 4 illustrates an example flow diagram of example processes for analyzing travel patterns to propose transit points.

FIG. 4 illustrates an example flow diagram 400 of example processes for analyzing travel patterns to propose transit points. The operations of FIG. 4 may be performed, for example, by the system 202. However, the operations of FIG. 4 are not limited to such a system, and may be performed using other systems/configurations.

The operation begins in step 402 where a route planning query data (e.g., route planning query data 222) associated with the transit system (e.g., transit system 302) is received. In step 404, an existing transit point within the transit system is identified for analysis based on the received route planning query data. The existing transit points can be, for example, bus stops, train stations or taxi stands. In step 406, location information including geo-location paths of a plurality of mobile devices is received. The location information can be, for example, global locationing system data, cell tower triangulation data, or Wi-Fi access point information. The location information can also be associated with mobile devices of users of the transit system. Each of the geo-location paths includes the identified transit point. In step 408, a proposed transit point is determined based on the geo-location paths of the received location information.

Modes of transportations of users associated with the plurality of mobile devices may be determined based on accelerometer readings of the mobile devices. The proposed transit point can also be determined in step 408 based on such determined modes of transportations. In addition, congestion levels associated with the identified existing transit point can be determined, and the proposed transit point may also be determined in step 408 based on the determined congestion levels.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include, but not limited to, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
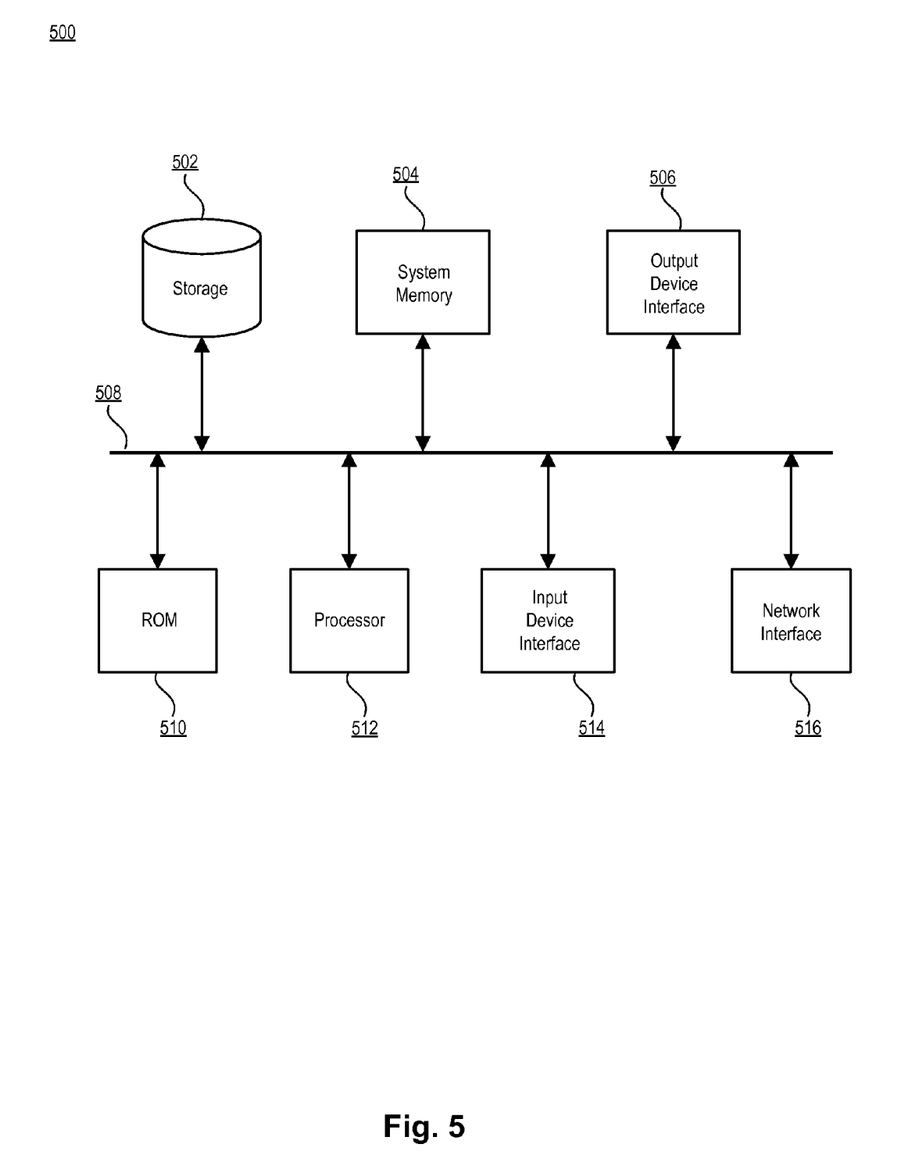
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject technology described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

Aspects of the subject technology described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that not all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for analyzing travel patterns in transit systems, the method comprising:
   receiving route planning query data associated with a transit system;
   identifying an existing transit point of the transit system for analysis based on the received route planning query data;
   receiving location information including geo-location paths of a plurality of mobile devices, each of the geo-location paths including the identified transit point; and
   determining a proposed transit point for the transit system based on the geo-location paths of the received location information.

2. The method of claim 1, wherein the existing transit point is a bus stop, train station, trolley stop, tram stop, ferry stop or taxi stand.

3. The method of claim 1, wherein the location information comprises at least one of global locationing system data, cell tower triangulation data, or Wi-Fi access point information.

4. The method of claim 1, wherein the location information is associated with mobile devices of users of the transit system.

5. The method of claim 4, further comprising receiving accelerometer readings from the mobile devices; and
   determining modes of transportation of the users of the mobile devices based on the received accelerometer readings,
   wherein the determining the proposed transit point for the transit system further comprises determining the proposed transit point for the transit system based on the geo-location paths of the received location information and the determined modes of transportation of the users.

6. The method of claim 1, wherein the determining the proposed transit point comprises:
   determining endpoints of the geo-location paths; and
   determining the proposed transit point based on the determined endpoints.

7. The method of claim 1, further comprising determining a congestion level associated with the identified existing transit point based on the received location information, wherein the determining the proposed transit point for the transit system further comprises determining the proposed transit point for the transit system based on the geo-location paths of the received location information and the determined congestion level.

8. The method of claim 7, wherein the determining the proposed transit point comprises determining the proposed transit point for the transit system based on the geo-location paths and the determined congestion level.

9. A system for analyzing travel patterns in transit systems, the system comprising:
   a memory storing executable instructions; and
   a processor coupled to the memory configured to execute the stored executable instructions to:
     receive route planning query data associated with a transit system;
     identify an existing transit point of the transit system for analysis based on the received route planning query data;
     receive location information including geo-location paths of a plurality of mobile devices, each of the geo-location paths including the identified transit point; and
     determine a proposed transit point for the transit system based on the geo-location paths of the received location information.

10. The system of claim 9, wherein the existing transit point is a bus stop, train station, trolley stop, tram stop, ferry stop or taxi stand.

11. The system of claim 9, wherein the location information comprises at least one of global locationing system data, cell tower triangulation data, or Wi-Fi access point information.

12. The system of claim 9, wherein the location information is associated with mobile devices of users of the transit system.

13. The system of claim 12, further comprising receiving accelerometer readings from the mobile devices; and
   wherein the processor is further configured to determine modes of transportation of the users of the mobile devices based on the received accelerometer readings,
   wherein the determining the proposed transit point for the transit system further comprises determining the proposed transit point for the transit system based on the geo-location paths of the received location information and the determined modes of transportation of the users.

14. The system of claim 9, wherein the determining the proposed transit point comprises:
   determining endpoints of the geo-location paths; and
   determining the proposed transit point based on the determined endpoints.

15. The system of claim 9, wherein the processor is further configured to determine a congestion level associated with the identified existing transit point based on the received location information, wherein the determining the proposed transit point for the transit system further comprises determining the proposed transit point for the transit system based on the geo-location paths of the received location information and the determined congestion level.

16. The system of claim 15, wherein the determining the proposed transit point comprises determining the proposed transit point for the transit system based on the geo-location paths and the determined congestion level.

17. A machine-readable storage medium comprising machine-readable instructions for causing a processor to execute a method for analyzing travel patterns in transit systems, the method comprising:
   receiving route planning query data associated with a transit system;

identifying an existing transit point of the transit system for analysis based on the received route planning query data;

receiving location information associated with mobile devices of users of the transit system, the location information including geo-location paths of a plurality of mobile devices and each of the geo-location paths including the identified transit point;

determining end points of the geo-location paths; and determining a proposed transit point for the transit system based on the determined end points of the geo-location paths.

18. The machine-readable storage medium of claim 17, wherein the existing transit point is a bus stop, train station, trolley stop, tram stop, ferry stop or taxi stand.

19. The machine-readable storage medium of claim 17, wherein the location information comprises at least one of global locationing system data, cell tower triangulation data, or Wi-Fi access point information.

* * * * *